(12) United States Patent
Trouvé

(10) Patent No.: US 10,399,879 B2
(45) Date of Patent: Sep. 3, 2019

(54) PROCESS AND DEVICE FOR TREATING A BIOMASS MIXED WITH WATER IN ORDER TO PRODUCE DRINKING WATER, BIOGAS AND COMBUSTIBLE SOLIDS

(71) Applicant: Franck Merican, Montpellier (FR)

(72) Inventor: Emmanuel Trouve, Vacquières (FR)

(73) Assignee: NEREUS SAS, Le Pouget (FR)

(*) Notice: Subject to any disclaimer, the term of this patent is extended or adjusted under 35 U.S.C. 154(b) by 317 days.

(21) Appl. No.: 14/890,666

(22) PCT Filed: Apr. 30, 2014

(86) PCT No.: PCT/EP2014/058901
§ 371 (c)(1),
(2) Date: Nov. 12, 2015

(87) PCT Pub. No.: WO2014/184004
PCT Pub. Date: Nov. 20, 2014

(65) Prior Publication Data
US 2016/0122218 A1    May 5, 2016

(30) Foreign Application Priority Data
May 13, 2013    (LU) .......................... 92192

(51) Int. Cl.
C02F 9/00    (2006.01)
C02F 11/12   (2019.01)
C02F 11/04   (2006.01)
C02F 3/28    (2006.01)
C01B 25/45   (2006.01)

(52) U.S. Cl.
CPC .............. *C02F 9/00* (2013.01); *C01B 25/451* (2013.01); *C02F 3/28* (2013.01); *C02F 3/2866* (2013.01); *C02F 11/04* (2013.01); *C02F 11/12* (2013.01); *C02F 2209/05* (2013.01); *C02F 2209/09* (2013.01); *C02F 2209/11* (2013.01); *C02F 2301/046* (2013.01); *C02F 2303/06* (2013.01); *C02F 2303/26* (2013.01); *C02F 2305/023* (2013.01); *Y02E 50/343* (2013.01); *Y02W 10/12* (2015.05); *Y02W 10/23* (2015.05)

(58) Field of Classification Search
CPC ............................. C02F 3/28; C02F 2303/06
See application file for complete search history.

(56) References Cited

U.S. PATENT DOCUMENTS

| | | | |
|---|---|---|---|
| 7,722,768 B2* | 5/2010 | Abma .................. | C02F 1/5254 210/259 |
| 2005/0040103 A1* | 2/2005 | Abu-Orf ................. | C02F 3/28 210/603 |
| 2012/0219984 A1* | 8/2012 | Rivera .................. | C02F 3/006 435/29 |

* cited by examiner

*Primary Examiner* — Ngoc-Yen Nguyen
(74) *Attorney, Agent, or Firm* — Steven M. Shape; Dennemeyer & Associates, LLC

(57) ABSTRACT

The present invention relates to a process for treating a biomass (1) mixed with water in order to produce, independently, combustible solids (14) and drinking water (12) and biogas (13A, 13B), and also to a device for treating a biomass (1) mixed with water in order to produce, independently, combustible solids (14), drinking water (12) and biogas (13A, 13B).

15 Claims, 2 Drawing Sheets

PROCESS AND DEVICE FOR TREATING A BIOMASS MIXED WITH WATER IN ORDER TO PRODUCE DRINKING WATER, BIOGAS AND COMBUSTIBLE SOLIDS

DESCRIPTION—PRIOR ART

The present invention relates to a method for treating a biomass mixed with water in order to produce drinkable water, biogas and combustible dry materials according to claim 1 and a device for treating a biomass mixed with water for producing drinkable water, biogas and combustible dry materials according to claim 6.

One skilled in the art intervening in the present invention should have knowledge in hydraulics, fermenters, biomass treatment and bioenergetics.

Patent EP 2390235 describes a method and a device for treating organic liquid wastes characterized in that a digestate from a biogas reactor is centrifuged in a centrifugation step resulting in a centrifuged liquid fraction and a centrifuged concentrated fraction before being subject to ultrafiltration and in that the centrifuged concentrated fraction is returned to the biogas reactor.

Patent EP 2060544 describes a method and a device for preparing material for microbiological fermentation.

U.S. Pat. No. 6,059,971 describes a method and a device for thickening and circulating sludges of waste waters.

Bougrier, C and Albasi, Claire and Delgenes, J P and Carrere H, Chemical engineering and processing, Vol. 4, 2006, pages 711 to 718 describes the effects of ultrasonic, thermal and ozone pre-treatments on the solubilization of active sludges and anaerobic biodegradability.

Patent DE 10 2004 030 482 describes a method for treating waste waters from the preparation and from the treatment of organic wastes (preferably manure) by means of a biogas fermenter coupled with ultrafiltration and reverse osmosis characterized in that during ultrafiltration, suspended materials are returned into the biogas fermenter.

U.S. Pat. No. 6,368,849 describes a method and a device for treating organic liquid wastes in an anaerobic fermenter comprising a separation step with an ultrafiltration membrane, a step for returning the methane-enriched fraction into the biogas reactor, a step for treating a permeate with an ammonia stripper resulting in an ammonia fraction and a fraction of a nutrient salt and a step for separating the fraction of nutrient salt in a concentrated fraction of a fertilizer and a water fraction.

The closest state of the art is patent EP 2390235.

The difference between patent EP 2390235 and the present invention is that
- the anaerobic fermenter (2, 10) has at least two output conduits directly connected to said anaerobic fermenter (2, 10),
- the dehydration device (16) discharges dehydration water (15) directly into at least one anaerobic fermenter (2, 10),
- the milled liquid digestate produced in step c) is lyzed in at least one lysis device and
- in step f) the milled and lyzed concentrated liquid digestate is returned, to the first anaerobic fermenter in the case of a method comprising a single anaerobic fermenter for producing combustible dry materials, and to at least one second anaerobic fermenter in the case of a method comprising at least two anaerobic fermenters for producing combustible dry materials and for producing a first fraction of said biogas and a second fraction of said biogas, without any loss of concentrated liquid digestate and of milled and lyzed concentrated humid digestate between step (a) and step (f),
- and that step g) is a dehydration step for producing combustible dry materials, by means of a dehydration device directly connected through a single discharge conduit to an outlet of at least one anaerobic fermenter, said concentrated liquid digestate being mixed in said at least one anaerobic fermenter with said milled and lyzed concentrated humid digestate which is in totality re-injected into said at least one anaerobic fermenter.

In fact EP 2390235 incites one skilled in the art to graft the devices (4, 5, 6) of the present invention directly subsequent to the dehydration device (16) of the present invention (cf figure of EP 2390235, notably the reference sign (19) "separator" (corresponding to the dehydration device (16) of the present invention) subsequent to which all the other essential devices are grafted) without however inciting one skilled in the art to discharge the dehydration water directly into at least one anaerobic fermenter (2,10), while in the present invention, decoupling is carried out between the production of combustible dry materials (14) and the production of drinkable water.

Now, there is an advantage of deviating from the teaching of a single outlet of EP 2390235 by adding a second outlet directly at the anaerobic fermenter (2, 10) connected to a dehydration device (16) which produces combustible dry materials (14) and discharges a dehydration water (15) directly inside the anaerobic fermenter (2, 10).

This difference has the technical effect of providing a better yield in energy produced per biomass unit for the combustion of improved combustible dry materials and a better yield in biogas (cf. table 2), a reduction in the volume of the anaerobic reactor (fermenter) required for producing o1 $Nm^3$ of biogas per day, an amount of collected water at least equal to that of EP 2390235.

Table 2 shows a value of 255 $Nm^3$ of biogas/ton of dry materials for EP 2390235 while an exceptionally high value of 470 $Nm^3$ of biogas/ton of dry materials is attained for the present invention.

Table 2 shows a value of 870 kWh/ton of combustible dry materials for EP 2390235 while an exceptionally high value of 1650 kWh/ton of combustible dry materials is attained for the present invention.

Starting from document EP 2390235, the targeted technical problem is to provide an alternative method and an alternative device having improved efficiency for producing combustible dry materials and biogas while ensuring production of drinkable water, by using at least one anaerobic reactor (fermenter) with a smaller volume than that of reactors of the prior art.

The solution of the present invention is to successively mill, separate the fibers and particles, extract the water and lyze at least once a milled concentrated digestate (17) before returning the milled and lyzed concentrated humid digestate (37, 37A, 37B) to at least one fermenter where it will be mixed with the concentrated liquid digestate (17) and directly connecting the dehydration device through a single discharge conduit to an outlet of at least one fermenter in order to produce combustible dry materials.

The solution is not obvious considering document EP 2390235 alone.

Indeed, EP 2390235 teaches us on page 5 column 8 lines 43 to 46 that a significant advantage of its device is that the liquid/solid separation steps are carried out after the biogas fermenter and that the method is continuous, while, on the contrary, in the present invention, the production of combustible dry materials is accomplished directly at an outlet from among both outlets of the fermenter, preferably through an outlet located in the bottom of the anaerobic fermenter (i.e. located under the mixer (36)) in order to remove the heavy/concentrated digestate and not the upper portion contained in the fermenter which in majority is liquid, through a dehydration device directly connected through a conduit to at least one outlet of an anaerobic fermenter.

One skilled in the art starting with document EP 2390235 may also be incited to place a dehydration device at the end of the line of the treatment plant (cf. figure of EP 2390235, notably the reference numbers 59 (vacuum evaporation) and 61 (solid fertilizer)), i.e. far from the biogas fermenter, in order to obtain a solid fertilizer while on the contrary in the present invention, the dehydration device is directly connected through a single discharge conduit to an outlet from among both outlets of at least one fermenter. In the present invention, a bias was therefore overcome.

Further, EP 2390235 uses the extracted solid phase (21), after passing in a separator (19), as compost (a compost is always humid, therefore not dry and not combustible unlike the present invention) (cf. page 4 column 5 lines 4-6), while on the contrary in the present invention there is no loss of digestate during treatment steps.

The dehydration device (16) of the present invention is both more performing for dehydrating the digestate than the vacuum evaporation device of document EP 2390235 (cf. table 2). One skilled in the art would not have contemplated such a modification of document EP 2390235 in the light of the prior art.

One skilled in the art would not have imagined simplifying the device of document EP 2390235 for producing combustible dry materials since this document does not have any discharge conduit directly connected to at least one outlet of a fermenter. As explained earlier, considering document EP 2390235, one skilled in the art is strongly guided and incited to place the vacuum evaporation device far from the fermenter, without any conduit directly connected to the fermenter, and only after the acid washing device (39, 43).

EP 2390235 also discloses in its single figure, a device for treating organic liquid wastes, characterized in that a digestate (17) from a biogas reactor (9) is centrifuged in a centrifugation step (25) resulting in a centrifuged liquid fraction (29) and a centrifuged concentrated fraction before being subject to ultrafiltration (31) and in that the centrifuged concentrated fraction (27) is returned to the biogas reactor (9).

Thus, EP 2390235 discourages sampling a concentrated liquid digestate in the bottom of the reactor (9) but on the contrary samples a non-concentrated liquid digestate (17) only in the clear upper portion of the reactor (9). By Earth's gravity, the heaviest digestate (concentrated liquid digestate) will be deposited at the bottom of the anaerobic reactor while the most lightweight digestate (non-concentrated liquid digestate) will be found in the upper portion of the anaerobic fermenter. Further, EP 2390235 does not use any pump/milling machine for a concentrated liquid digestate, or a water extractor, or a device for lysis of a milled liquid digestate.

EP 2390235 teaches us on page 4, column 6, lines 51 to 54 that the purpose of the ultrafiltration step is to obtain a free permeate of particles from the centrifuged liquid fraction, while the present invention uses a water extractor (6) in order to obtain the same amount of water.

Even by combining the closest prior art with any other document from the prior art, one skilled in the art would not have found any incitation in the prior art for producing improved combustible dry materials (14) (i.e. from the mixture of a concentrated liquid digestate (17) with a milled and lyzed concentrated humid digestate (37, 37A, 37B)) by means of a dehydration device (16) directly connected through a single discharge conduit (3B, 3E) to at least one outlet of at least one anaerobic fermenter (2, 10), said concentrated liquid digestate (17) being mixed in said at least one anaerobic fermenter (2, 10) with the milled and lyzed concentrated humid digestate (37, 37A, 37B) which is totally re-injected into said at least one anaerobic fermenter (2, 10) (without any loss of digestate during the treatment process) in order to improve the yield in energy produced per unit of biomass by combustion of combustible dry materials and improve the yield in biogas (cf. table 2), reduce the volume of the anaerobic reactor (fermenter) for producing 1 Nm³ of biogas per day, and produce a quality of collected water at least equal to that of the mentioned prior art while producing combustible dry materials.

Upon considering the prior art, one skilled in the art would not have either contemplated the mixing of the concentrated liquid digestate (17) with the milled and lyzed concentrated humid digestate (37, 37A, 37B) in at least one anaerobic fermenter in order to improve the quality of the combustible dry materials and notably improve the yield in energy produced per unit of biomass by the combustion of combustible dry materials.

The yield in biogas (13A, 13B) of the device of the present invention is increased by targeting materials which are difficult to digest and to ferment and by milling them and lyzing them one or several times before re-injecting them into the anaerobic fermenter (2, 10) in order to produce improved combustible dry materials (14) and improve the yield in biogas (13A, 13B), this is why the concentrated liquid digestate (17) is sampled at the bottom of the anaerobic reactor (2,10) and not in the upper portion of the anaerobic reactor (2, 10).

Even if one skilled in the art had had the idea of combining EP 2390235 with a document of the prior art, table 2 shows that the yields in biogas of the present invention are much better than those of EP 2390235 or DE 10 2004 030 482 or U.S. Pat. No. 6,368,849, which proves that the present invention has different technical characteristics from those of the prior art.

The known yield in biogas from different cultures was calculated according to the IUSE source in Germany. Table 1 below reflects the known results for different cultures.

TABLE 1

| Culture | Crude yield (t/ha) | Yield in gas (m³/t) | Yield in gas (m³/ha) |
| --- | --- | --- | --- |
| Potatoes | 45 | 110 | 4,950 |
| Wheat grains | 8 | 660 | 5,280 |
| Corn cobs | 15 | 430 | 6,450 |
| Wheat, entire plant | 13 | 500 | 6,500 |
| Grass | 80 | 95 | 7,600 |
| Fodder beet | 100 | 100 | 10,000 |
| Corn silage | 50 | 205 | 10,250 |

Source: IUSE - Germany

It is also known (source: IUSE—Germany) that the yield in biogas (normalized, liter of biogas per kg) according to the type of organic material is spread in a decreasing way as follows:

Wheat grains (best biogas yield), and then old bread, and then contents of a fat filter, and then mixture of corn cobs, and then corn silage, and then grass silage, and than food wastes, and then municipal biological wastes, and then potatoes, and then fodder beet, and then fresh pasture grass, and then potato peel wastes, and then pig manure, and then cattle manure (a poorer yield).

SUMMARY OF THE INVENTION

The method for treating a biomass (1) mixed with water for producing in a decoupled way drinkable water (12) and biogas (13A, 13B) and combustible dry materials (14) according to the present invention is defined in claim 1 and the device for treating a biomass (1) mixed with water for producing in a decoupled way drinkable water (12) and biogas (13A, 13B) and combustible dry materials (14) according to the present invention is defined in claim 6.

The term of "decoupled" means that the device produces drinkable water (12) at a different outlet or even away from, the outlet of the biogas (13A, 13B) and from the outlet of the combustible dry materials (14) directly localized at the surface of the anaerobic fermenter (2,10).

The anaerobic fermenter (2, 10) is generally stirred mechanically by rotation with a mixer (36).

The formation of biogas (13A, 13B) in an anaerobic fermenter (2, 10) gives the possibility of treating various wastes such as industrial food wastes, agricultural wastes, or biomass. The biogas may be defined as a gas which is rich in energy compounds, for example methane $CH_4$ or hydrogen $H_2$, obtained by biodegradation of the biomass, generally via an anaerobic route (i.e. in the absence of free oxygen). Production of biogas may be transformed into electricity by using an adequate device. The device of the present invention consumes the equivalent of 6 to 10% of the produced electricity. The revenues may come from the sale of electricity, from giving value to the heat produced by the generators, from a fee related to the upgrading of the wastes (from 20 to 60 €/ton).

The biomass is defined as being organic material from the growth or multiplication of living organisms (microorganisms, plants, animals) for example wheat grains, old bread, contents of a fat filter, corn cobs, corn silages, grass silages, food wastes, municipal biological wastes, potatoes, fodder beet, straw, fresh pasture grass, potato peel wastes, cattle manure (pigs, cows, cattle), green wastes, harvests or silages of cultivated plants, organic materials from domestic or industrial wastes, algae, animal by-products, either alone or as a mixture. The biomass may also be defined as the whole of the microorganisms cultivated in a biological reactor (for example a mesophilic or thermophilic anaerobic fermenter).

Suspended materials are defined as being materials contained in an aqueous fluid and retained on a filter with a cutoff threshold equal to 0.10 or 0.45 microns (the measurement method is standardized).

The dry material is defined as being a material from an aqueous fluid other than water, measured after drying in an oven at 110° C. (the measurement method is standardized).

The invention is inventive in that:
the amount and quality of the extracted (drinkable) water do not depend on the quality of the digestate, they are controllable by the design, the dimensioning and the control of the extraction module,
the energy required for the extraction is compensated by the energy supplement obtained on the device by the integrated water extraction,
the advanced piping system simultaneously deals with the optimization of the hydraulic flows and on the energy optimization,
it is possible to act jointly on the biodegradability and the filterability,
the efficiency of the device is increased by targeting materials difficult to digest and to ferment and by milling them and lyzing them one or several times before re-injecting them into the anaerobic fermenter (2, 10) in order to improve the biogas yield (13A, 13B), this is why the concentrated liquid digestate (17) is sampled at the bottom of the anaerobic reactor (2, 10) and not in the upper portion of the anaerobic reactor (2, 10).

Struvite may be obtained by the method of the present invention at each outlet of the water extractor (6) at the conduits (39, 42) and upstream from the water extractor (6) at the conduit (41). The purity of struvite is high at the conduit (42) and is of standard quality at the conduits (39) and (41).

The present invention relates to a method for treating a biomass (1) mixed with water in order to produce in a decoupled way drinkable water (12) and biogas (13A, 13B) and combustible dry materials (14), said drinkable water (12) not containing any suspended material and having a dry material content of less than 1%, less than 0.9%, less than 0.8%, less than 0.7%, less than 0.6%, less than 0.5%, less than 0.4%, less than 0.3%, less than 0.2%, less than 0.1%, said method successively comprising the following steps:
(a) subjecting said biomass (1) mixed with water to anaerobic fermentation in at least one first anaerobic fermenter (2) comprising at least two output conduits (3A; 3B) directly connected to said first anaerobic fermenter (2), resulting in a concentrated liquid digestate (17) and in biogas (13A), and
(b) pumping and milling said concentrated liquid digestate (17) by means of at least one pump/milling machine (4) resulting in a milled concentrated liquid digestate (27), and
(c) separating (5) the fibers and the particles of said milled concentrated liquid digestate (27) for obtaining clarified water (24) mixed with a remnant of a milled liquid digestate (25A) on the one hand and a milled concentrated humid digestate (25B) on the other hand which will pass into at least one lysis device (18C, 18B),
(d) having said clarified water (24) mixed with a remnant of a milled liquid digestate (25A) pass into at least one water extractor (6) for obtaining drinkable water (12) on the one hand and said remnants of a milled liquid digestate (25A) on the other hand which will pass into at least one lysis device (18A, 18B), and then subsequently
(e) obtaining a milled and lyzed concentrated humid digestate (37) from the lyzed mixture of the remnants of the milled liquid digestate (25A) with the milled concentrated humid digestate (25B),
(f) returning said milled and lyzed concentrated humid digestate (37, 37A, 37B), without any loss of the latter, to the first anaerobic fermenter (2) in the case of a method comprising a single anaerobic fermenter (2) for producing combustible dry materials (14) and for producing said biogas (13A),
and to at least one second anaerobic fermenter (10), comprising at least two output conduits (3E; 3F) directly connected to said second anaerobic fermenter (10) in the case of a method comprising at least two anaerobic fermenters (2, 10) for producing combustible dry materials (14) and for producing a first fraction (13A) of said biogas and a second fraction (13B) of said biogas, (g) dehydrating for producing said combustible dry materials (14), by means of a dehydration device (16) receiving said concentrated liquid digestate (17) mixed with said milled and lyzed concentrated humid digestate (37, 37A, 37B) on the one hand and discharging dehydration water (15) through at least one conduit (15A) directly into at least one anaerobic fermenter (2,10) on the other hand, said dehydration device (16) being directly connected through at least one single discharge conduit (3B, 3E) to at least one outlet of said first anaerobic fermenter (2) in the case of a device comprising a single anaerobic fermenter (2) and being directly connected through at least one single discharge conduit (3B, 3E) to at least one outlet of said second anaerobic fermenter (10) in the case of a device comprising at least two anaerobic fermenters (2, 10), said concentrated liquid digestate (17) being mixed in said at least one anaerobic fermenter (2, 10) to said milled and lyzed concentrated humid digestate (37, 37A, 37B) after total re-injection of said milled and lyzed concentrated humid digestate (37, 37A, 37B) into at least one anaerobic fermenter (2, 10).

In step a) of said method, said concentrated liquid digestate (17) lies at the bottom of said at least one first anaerobic fermenter (2), and in step b) the pumping of said concentrated liquid digestate (17) is carried out from the bottom of said at least one first anaerobic fermenter (2) there is so as to be brought to said at least one pump/milling machine (4). The method of the present invention produces drinkable water (12) by means of the conduit (42) connected to said at least one water extractor (6) and off the passing of said clarified water (24) mixed with a remnant of a milled liquid digestate (25A) in said at least one water extractor (6). Said drinkable water (12) preferably has a dry material content of less than 0.5%, more preferentially less than 0.4%. The method of the present invention comprises at least one additional step applied at the conduit (42) connected to said at least one water extractor (6), said additional step being a step for controlling the quality of the extracted water by means of of the turbidity and conductivity. The method of the present invention comprises at least one additional step applied at a conduit (3a) connected to said at least one first anaerobic fermenter (2), said additional step being a step for controlling the quality of the biomass by means of the viscosity and by a rapid measurement of biodegradability.

Struvite may be obtained by the method of the present invention, which struvite is obtained at each outlet of the water extractor (6) at the conduits (39, 42) and upstream from the water extractor (6) at the conduit (41).

The dry materials (14) are preferably combustible but they may also be able to be humidified or composted.

The present invention relates to a device for treating a biomass (1) mixed with water for producing in a decoupled way drinkable water (12) and biogas (13A, 13B) and combustible dry materials (14), said device comprising:
(i) at least one first anaerobic fermenter (2) comprising at least two output conduits (3a; 3b) directly connected to said first anaerobic fermenter (2), which receives the biomass (1) mixed with water and produces biogas (13A) by fermentation of a concentrated liquid digestate (17),
(ii) at least one pump/milling machine (4) for pumping and milling said concentrated liquid digestate (17), a resulting in a milled liquid digestate (27), said pump/milling machine (4) being directly connected to said first anaerobic fermenter (2) through the output conduit (3a),
(iii) at least one separator of fibers and particles (5) for separating
clarified water (24) mixed with a remnant of milled liquid digestate (24A) on the one hand, and the a milled concentrated humid digestate (25B) which will pass in at least one lysis device (18C, 18B), said separator of fibers and particles (5) being directly connected to said pump/milling machine (4),
(iv) at least one water extractor (6) in which between said clarified water (24) mixed with said remnant of milled liquid digestate (25A) and which extracts drinkable water (12) on the one hand and said remnant of milled liquid digestate (25A) on the other hand, said the water extractor (6) being directly connected to said separator of fibers and particles (5),
(v) said at least one lysis device (18A, 18B, 18C) suitable for lyzing said remnant of milled liquid digestate (25A) and said milled concentrated humid digestate (25B) and a milled and lyzed concentrated humid digestate (37) stemming from a lyzed mixture of said remnant of milled liquid digestate (25A) with said milled concentrated humid digestate (25B), said lysis device (18A, 18B) being directly connected to said water extractor (6) and said lysis device (18C) being directly connected to said separator of fibers and particles (5),
(vi) at least one conduit (40A, 40B) allowing a milled and lyzed concentrated humid digestate (37, 37A, 37B) to exit said lysis device (18B) and to be returned without any loss of the latter,
to the first anaerobic fermenter (2) in the case of a device comprising a single anaerobic fermenter (2) for producing said biogas (13A) and said combustible dry materials (14),
and at least one second anaerobic fermenter (10) comprising at least two output conduits (3E; 3F) directly connected to said second anaerobic fermenter (10), which receives said concentrated liquid digestate (17) through a conduit (3c) directly connected to the first anaerobic fermenter (2) on the one hand, and receives said milled and lyzed concentrated humid digestate (37, 37A, 37B) as well as dehydration water (15) in the case of a device comprising at least two anaerobic fermenters (2,10) for producing a first (13A) and a second fraction (13B) of said biogas,
(vii) at least one dehydration device (16) receiving said concentrated liquid digestate (17) mixed with said milled and lyzed concentrated humid digestate (37, 37A, 37B) and producing said combustible dry materials (14) on the one hand, and said dehydration device (16) discharging through at least one conduit (15A) said dehydration water (15) directly into at least one anaerobic fermenter (2, 10), said dehydration device (16) being directly connected through at least one single discharge conduit (3B, 3E) to at least one outlet of said first anaerobic fermenter (2) and being directly connected through at least one single discharge conduit (3B, 3E) to at least one outlet of said second anaerobic fermenter (10) in the case of a device comprising at least two anaerobic fermenters (2, 10), said concentrated liquid digestate (17) being mixed in at least one anaerobic fermenter (2, 10) with said milled and lyzed concentrated humid digestate (37, 37A, 37B) after total reinjection of said milled and lyzed concentrated humid digestate (37, 37A, 37B) into said at least one anaerobic fermenter (2,10).

In the device of the present invention, at least one conduit (3a) allows said concentrated liquid digestate (17) to flow out from the bottom of said at least one first anaerobic fermenter (2) and to flow into said at least one pump/milling machine (4). At least one separator of fibers and particles (5) receives a milled liquid digestate (27) and discharges a milled concentrated humid digestate (25B) on the one hand and clarified water (24) mixed to a remnant of a milled liquid digestate (25A) on the other hand, said at least one separator of fibers and particles (5) being connected to said at least one pump/milling machine (4) through at least one conduit (38) and being connected to said at least one water extractor (6) through at least one conduit (41). In the case of a device comprising two anaerobic fermenters (2, 10), wherein said at least one first anaerobic fermenter (2) produces a first portion of the biogas (13A) and wherein said at least one second anaerobic fermenter (10) produces a second portion of the biogas (13B) said second anaerobic fermenter (10) being connected to said lysis device (18A, 18B, 18C) through at least one conduit (40A) and said first anaerobic fermenter (2) being connected to said lysis device (18A, 18B, 18C) through at least one conduit (40B). The lysis device (18C) is connected to said at least one separator of fibers and particles (5) through at least one conduit (8). The lysis device (18A) is connected to said at least one water extractor (6) through at least one conduit (39) and the lysis device (18B) is connected to the lysis devices (18A, 18C) through a conduit. In the case of a device comprising at least two anaerobic fermenters (2, 10), said second anaerobic fermenter (10) is connected to the bottom of said first anaerobic fermenter (2) through at least one conduit (3C) leading said concentrated liquid digestate (17) to said second anaerobic fermenter (10).

Said at least one separator of fibers and particles (5) producing said clarified water fraction (24) mixed with said remnant of a milled liquid digestate (25A) flowing out of said at least one separator of fibers and particles (5) through at least one conduit (41) on the one hand and said milled concentrated humid digestate (25B) flowing out of said at least one separator of fibers and particles (5) through at least one conduit (8) on the other hand and, said milled concentrated humid digestate (25B) either being injected through the conduit (11) into said at least one pump/milling machine (4) when at least one bypass means (23) returns the milled concentrated humid digestate (25B) to said at least one pump/milling machine (4) by means of the conduit (11), or injected through the conduit (8) inside said at least one lysis device (18C) when said at least one bypass means (23) returns the milled concentrated humid digestate (25B) to said at least one lysis device (18C), or simultaneously injected into said at least one pump/milling machine (4) and into said lysis device (18C), when said at least one bypass means (23) returns the milled concentrated humid digestate (25B) to said pump/milling machine (4) and to said lysis device (18C). At least one conduit for extracting biogas (21) extracts the biogas (13A) from the upper portion of said at least one first anaerobic fermenter (2) when at least one bypass means (19) returns a milled concentrated humid digestate and at least doubly lyzed (37B) through at least one conduit (40B) into said at least one first anaerobic fermenter (2). At least one conduit for extracting biogas (21) extracts a first portion of the biogas (13A) from the upper portion of said at least one first anaerobic fermenter (2) and also extracts a second portion of the biogas (13B) from the upper portion of said at least one second anaerobic fermenter (10) through a conduit (20) when said at least one bypass means (19) simultaneously returns a milled and at least doubly lyzed concentrated humid digestate (37A, 37B) to said first anaerobic fermenter (2) and to said second anaerobic fermenter (10). The device of the present invention may comprise at least one immersed pump/milling machine (4) inside said at least one first anaerobic fermenter (2). The device of the present invention at least comprises a dehydration device (16) connected through a conduit (15A) to said first anaerobic fermenter (2) in the case of a device comprising a single anaerobic fermenter (2) and at least one dehydration device (16) connected through a conduit (15A) to said second anaerobic fermenter (10) in the case of a device comprising at least two anaerobic fermenters (2, 10). Dehydration water (15) from said at least one dehydration device (16) is recycled to said at least one anaerobic fermenter (2, 10) through at least one conduit (15A).

DETAILED SUMMARY OF THE INVENTION

Figure 1:
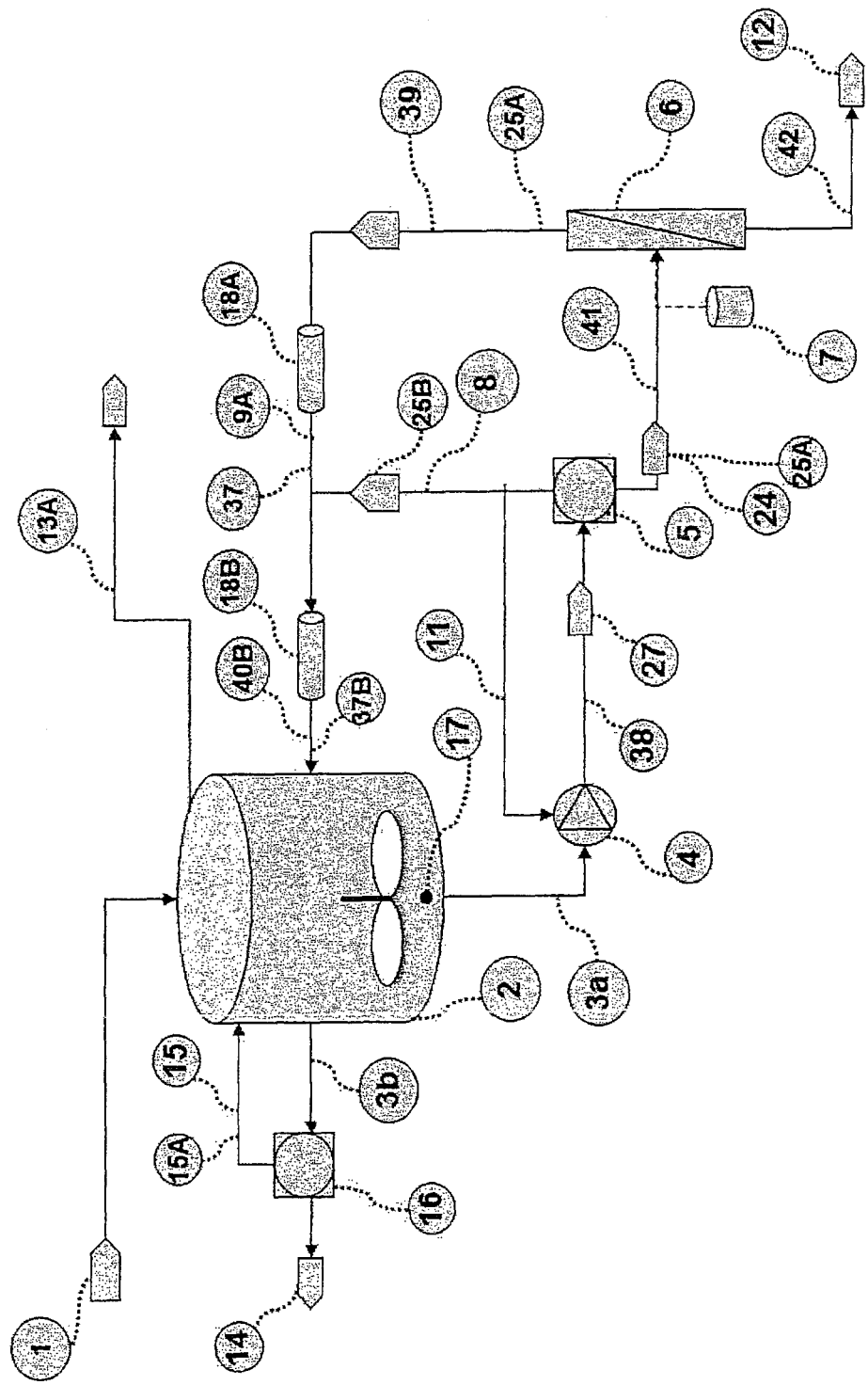
FIG. 1 shows a device for treating a biomass (1) mixed with water so as to produce in a decoupled way drinkable water (12) and biogas (13A) and combustible dry materials (14) by using a single anaerobic reactor (2).

In a first embodiment (FIG. 1), a biomass (1) mixed with water is introduced into an anaerobic reactor (2) for producing in a decoupled way drinkable water (12) and biogas (13A) and combustible dry materials (14). Said biomass confined in the anaerobic reactor (2) is mixed with anaerobic bacteria and produces biogas (13A) by fermentation. A concentrated liquid digestate (17) is pumped in the bottom of the reactor (2) via a conduit (3A) and said concentrated liquid digestate (17) then enters a pump/milling machine (4) which pumps and mills said concentrated liquid digestate (17). A milled liquid digestate (27) exits the pump/milling machine (4) and via the conduit (38) enters a separator of fibers and particles (5) which separates clarified water (24) mixed with a remnant of a milled liquid digestate (25A) on the one hand, and a milled concentrated humid digestate (25B) which will be subject to lysis in a lysis device (18B) via the conduit (8) which joins up with the conduit (9A), on the other hand, or else the milled concentrated humid digestate (25B) may be injected via the conduit (11) inside the pump/milling machine (4) in order to carry out additional milling before being lyzed in the lysis device (18B). A conduit (41) brings the clarified water (24) mixed with a remnant of a milled liquid digestate (25A) in a water extractor (6). A physicochemical preparation (7) will be grafted onto the conduit (41). The water extractor (6) extracts drinkable water (12) via the conduit (42) on the one hand and said remnant of a milled liquid digestate (25A) via the conduit (39) which brings said remnant of a milled liquid digestate (25A) to a first lysis device (18A) which lyzes a first time said remnant of a milled liquid digestate (25A) and which then via the conduit (9A) enters a second lysis device (18B) for carrying out a second lysis. A milled and at least doubly lyzed humid digestate (37B) then flows out through the conduit (40B) before joining up with the inner volume of the anaerobic reactor (2) in order to supply the latter with milled and doubly lyzed humid digestate (37B) for improving the biogas yield (13A) during anaerobic fermentation. Indeed, the more the digestate is milled and/or lyzed, the more easily it will be degraded by anaerobic bacteria of the reactor (2) and will thus produce more biogas (13A).

A dehydration device (16) receives said concentrated liquid digestate (17) via the conduit (3B) and produces said combustible dry materials (14) on the one hand and said dehydration water (15) on the other hand which is brought to said anaerobic reactor (2) via the conduit (15A).

Figure 2:
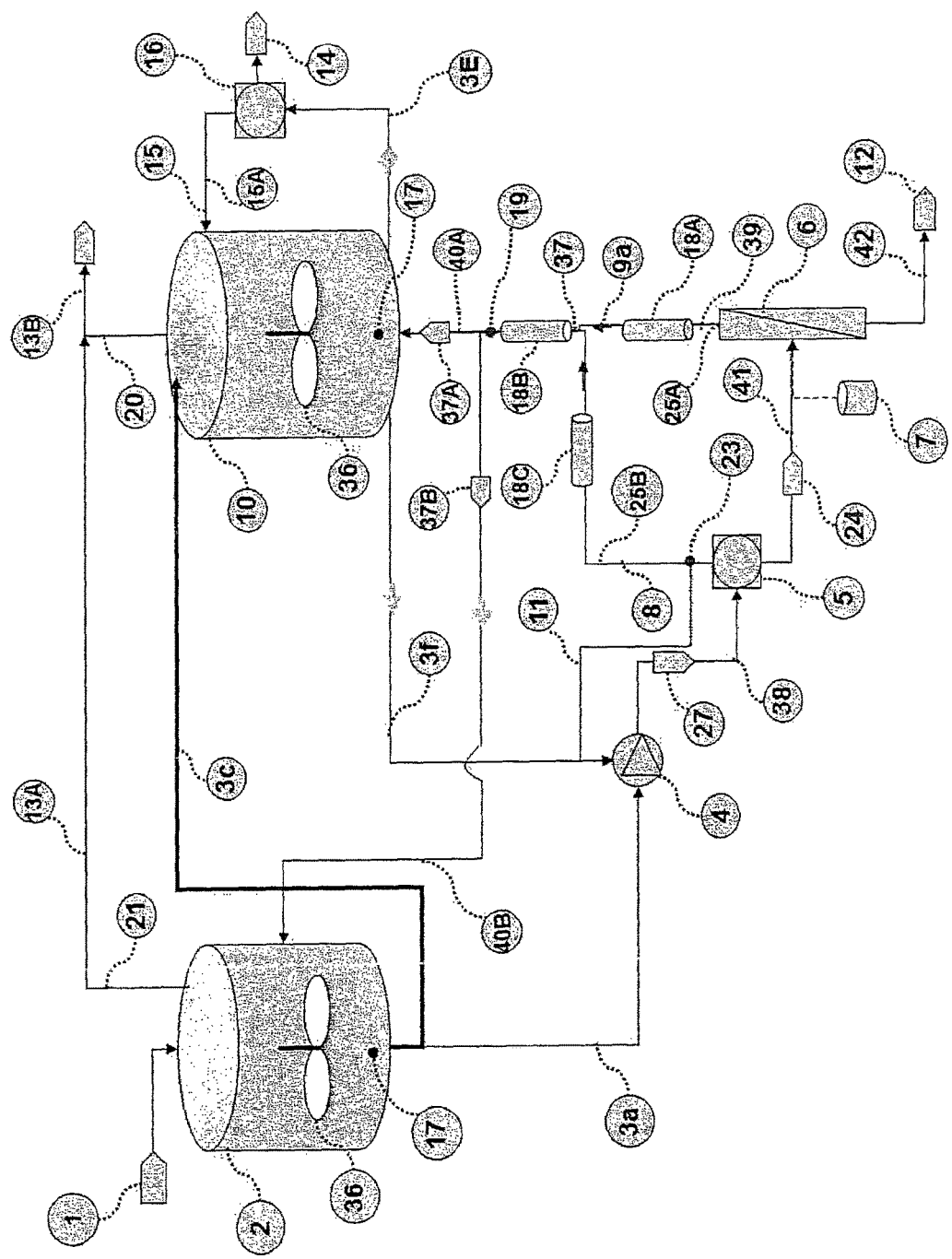
FIG. 2 shows a device for treating a biomass (1) mixed with water so as to produce in a decoupled way drinkable water (12) and biogas (13A, 13B) and combustible dry materials (14) by using two anaerobic reactors (2, 10).

In a second embodiment (FIG. 2), a biomass (1) mixed with water is introduced into an anaerobic reactor (2) for producing in a decoupled way drinkable water (12) and biogas (13A, 13B) and combustible dry materials (14). Said biomass (1) confined in the anaerobic reactor (2) is mixed by a mixer (36) with anaerobic bacteria and produces biogas (13A) by fermentation via the conduit (21). A concentrated liquid digestate (17) is pumped in the bottom of the reactor (2) via a conduit (3A) before entering a pump/milling machine (4) which pumps and mills said concentrated liquid digestate (17). A conduit (3C) may also bring said concentrated liquid digestate (17) inside a second anaerobic fermenter (10) in order to supply the latter with concentrated liquid digestate (17).

A milled liquid digestate (27) exits the pump/milling machine (4) and via the conduit (38) enters a separator of fibers and particles (5) which separates clarified water (24) mixed with a remnant of a milled liquid digestate (25A) on the one hand, and a milled concentrated humid digestate (25B) which will be subject to first lysis in a lysis device (18C) via the conduit (8) which after lysis, joins up with the conduit (9A) when the bypass means (23) returns the milled, concentrated humid digestate (25B) to said at least one lysis device (18C), or else the milled concentrated humid digestate (25B) may be injected via the conduit (11) inside the pump/milling machine (4) for carrying out additional milling when the bypass means (23) returns the milled concentrated humid digestate (25B) to the pump/milling machine (4), before being lyzed in the lysis device (18C). The bypass means (23) may also simultaneously return the milled concentrated humid digestate (25B) to said at least one lysis device (18C) and to said pump/milling machine (4). A conduit (41) brings the clarified water (24) mixed with a remnant of a milled liquid digestate (25A) into a water extractor (6). A physicochemical preparation (7) may be grafted onto the conduit (41). The water extractor (6) extracts drinkable water (12) via the conduit (42) on the one hand and extracts said remnant of a milled liquid digestate (25A) on the other hand via the conduit (39) which brings said remnant of a milled liquid digestate (25A) to a first lysis device (18A) which lyzes a first time said remnant of a milled liquid digestate (25A) in order to obtain a milled and lyzed concentrated humid digestate (37) (from the lyzed mixture of the remnant of the milled liquid digestate (25A) with the milled concentrated humid digestate (25B)), said milled and lyzed concentrated humid digestate (37) then via the conduit (9A) enters a second lysis device (18B) in order to carry out a second lysis. A milled and at least doubly lyzed humid digestate (37B) then exits through the conduit (40B) before joining up with the inner volume of the anaerobic reactor (2) in order to supply the latter with milled and at least doubly lyzed humid digestate (37B) for improving the biogas (13A) yield during anaerobic fermentation. Indeed, the more the digestate is milled and/or lyzed, the more easily it will be degraded by the anaerobic bacteria of the reactor (2) and will thus produce more biogas (13A). The bypass means (19) may also return either simultaneously a milled and at least doubly lyzed concentrated humid digestate (37A, 37B) to said first anaerobic fermenter (2) via the conduit (40B) and to said second anaerobic fermenter (10) via the conduit (40A) in order to produce biogas (13B) via the conduit (20), and only independently either to the first anaerobic fermenter (2) via the conduit (40B) or only to the second anaerobic fermenter (10) via the conduit (40A). A dehydration device (16) receives said concentrated liquid digestate (17) from the bottom of the second anaerobic fermenter (10) via the conduit (3E) and produces said combustible dry materials (14) on the one hand and said dehydration water (15) on the other hand which is brought via the conduit (15A) to said second anaerobic reactor (10). A dehydration device (16) identical with the one grafted onto the second anaerobic fermenter (10) may also be grafted onto the first anaerobic fermenter (2) in order to produce said combustible dry materials (14).

The concentrated liquid digestate (17) from the bottom of the second anaerobic fermenter (10) may also be directly injected via the conduit (3F) into the pump/milling machine (4). The device of FIG. 2 will produce more biogas than the one of FIG. 1.

Certain characteristics of the invention which are described as separate embodiments, may also be provided as a combination in a single embodiment. On the contrary, certain characteristics of the invention which are described as an embodiment in combination in a single embodiment, may also be provided separately as several separate embodiments.

Although the invention has been described in connection with specific embodiments thereof, it is obvious that several alternatives, modifications and variations may be detected by one skilled in the art. Thus, we have the intention of encompassing such alternatives, modifications and variations which fall under the scope of the claims hereafter.

Comparative Tests

The comparative tests of table 2 were conducted by using an identical amount of biomass (400 kg to 500 kg of pasture grass) which were introduced into the anaerobic reactor (fermenter) of the present invention (alternative 1: a single anaerobic reactor without any lysis device, i.e. the device of FIG. 1 wherein the lysis devices have been removed; alternative 2: a single anaerobic reactor with at least one lysis device, cf the device of FIG. 1), as well as in the anaerobic reactor of each of the devices of the prior art (cf. table 2). All the anaerobic reactors mentioned in table 2 contain an identical amount of water. The units repeated in Table 2 correspond to internationally recognized standards.

TABLE 2

| Criteria | | | | Prior art documents | | | Present invention | |
| --- | --- | --- | --- | --- | --- | --- | --- | --- |
| | Units | Minimum or worst value | Maximum or best value | Standardized technology in Germany | EP 2390235 A1 | DE 102004030482 A1 | U.S. Pat. No. 6,398,649 B1 | Without lysis device | With lysis device |
| Acceptable raw materials for producing biogas | Biomass used | | | Grass + water | Grass + water | Grass + water | Grass + water | Grass + water | Grass + water |

TABLE 2-continued

| Criteria | | | | Prior art documents | | | Present invention | |
| --- | --- | --- | --- | --- | --- | --- | --- | --- |
| | Units | Minimum or worst value | Maximum or best value | Standardized technology in Germany | EP 2390235 A1 | DE 102004030482 A1 | U.S. Pat. No. 6,398,649 B1 | Without lysis device | With lysis device |
| Biogas volume per biomass unit Ref. ISO11734: article of Angelidaki & Sanders, 2004 | Nm³ of biogas/ton of dry materials | 150 | 500 | 230 | 255 | 248 | 220 | 405 | 470 |
| Energy produced per biomass unit by combustion of combustible dry materials | kWh//ton of combustible dry materials | 2 | 2500 | 780 | 870 | 838 | 600 | 1300 | 1650 |
| Anaerobic reactor volume for producing 1 Nm³ of biogas per day Ref.: OE NORM S 2207-1 and 2207-2 | m³ | 2.3 | 0.5 | 1.2 | 1.5 | 1.6 | 2 | 0.7 | 0.6 |
| Water quality after treatment (EU directives 91/271/EC and 98/15/EC | Water quality after treatment | A | F | A | E, F | E, F | E, F | E, F | E, F |

The invention claimed is:

1. A method for treating a biomass (1) mixed with water for producing in a decoupled way combustible dry materials (14), drinkable water (12) and a biogas including a first fraction of biogas (13A),
the drinkable water (12) not containing any suspended material and having a dry material content strictly less than 1%,
said method successively comprising the following steps:
(a) subjecting the biomass (1) mixed with water to anaerobic fermentation in an anaerobic fermenter (2) to produce a concentrated liquid digestate (17) and the first fraction biogas (13A), wherein the anaerobic fermenter comprises at least two output conduits (3A, 3B);
(b) pumping and milling a portion of the concentrated liquid digestate (17) by a pump/milling machine (4) to produce a milled concentrated liquid digestate (27) containing fibers and particles;
(c) separating, using a separator (5), the fibers and the particles in said milled concentrated liquid digestate (27) to produce a clarified water (24) and a milled concentrated humid digestate (25B);
(d) feeding the clarified water (24) into a water extractor (6) to produce drinkable water (12) and a remnant of a milled liquid digestate (25A), wherein a first portion of the remnant of a milled liquid digestate (25A) is mixed with the clarified water (24) before the water extractor (6);
(e) passing a second portion of the remnant of the milled liquid digestate (25A) through a first lysis device (18A) and subsequently adding the resulting stream with the milled concentrated humid digestate (25B) to obtain a milled and lyzed concentrated humid digestate (37);
(f) returning the milled and lyzed concentrated humid digestate (37), without any loss thereof, to the anaerobic fermenter (2);
(g) passing a portion of the concentrated liquid digestate (17) through the output conduit (3B) of the anaerobic fermenter (2) to a dehydration device (16) to produce the combustible dry materials (14) and dehydration water (15), returning the dehydration water (15) directly to the anaerobic fermenter (2), wherein the concentrated liquid digestate (17) is mixed in the anaerobic fermenter (2) with the milled and lyzed concentrated humid digestate (37) after totally re-injecting the milled and lyzed concentrated humid digestate (37) into the anaerobic fermenter (2).

2. The method according to claim 1, wherein,
in step (a), the concentrated liquid digestate (17) lies at a bottom portion of anaerobic fermenter (2), and
in step (b) pumping of the portion of the concentrated liquid digestate (17) is carried out from the bottom portion of the anaerobic fermenter (2).

3. The method according to claim 1, further comprising least one additional step applied at a conduit (42) connected to the water extractor (6), wherein the additional step controls the quality of the drinkable water (12) by means of turbidity and conductivity.

4. The method according to claim 1, further comprising at least one additional step applied at the conduit (3A), wherein the additional step controls the quality of the biomass (1) by means of viscosity and by a measurement of biodegradability.

5. A device for treating a biomass (1) mixed with water in order to produce in a decoupled way combustible dry materials (14), drinkable water (12), a first fraction of biogas (13A), and optionally a second fraction of biogas (13B), said device comprising:
(i) an anaerobic fermenter (2) comprising at least two output conduits (3A; 3B), wherein the anaerobic fermenter (2) is configured to perform anaerobic fermentation of the biomass (1) to produce a concentrated liquid digestate (17) and the first fraction of biogas (13A);
(ii) a pump/milling machine (4) for pumping and milling a portion of the concentrated liquid digestate (17) to produce a milled liquid digestate (27) comprising fibers and particles, wherein the pump/milling machine (4) is connected to the anaerobic fermenter (2) by the output conduit (3A);
(iii) a separator (5) for separating fibers and particles from the milled liquid digestate (27) to produce clarified water (24) and a milled concentrated humid digestate (25B), wherein the separator (5) is connected to the pump/milling machine (4);

(iv) a water extractor (6) for treating the clarified water (24) to produce drinkable water (12) and a remnant of a milled liquid digestate (25A), wherein the water extractor (6) is connected to the separator (5);

(v) a first lysis device (18A), adapted for lyzing a portion of the remnant of the milled liquid digestate (25A), a second lysis device (18B), adapted for lyzing a mixture of the milled concentrated humid digestate (25B) and a milled and lyzed concentrated humid digestate (37) obtained after the first lysis device (18A), wherein the first lysis device (18A) is connected to the water extractor (6) and the second lysis device (18B) is downstream from the first lysis device (18A);

(vi) a conduit (40B), which allows the milled and lyzed concentrated humid digestate (37B) to flow out of the second lysis device (18B) without any loss thereof and to be returned to the anaerobic fermenter (2);

(vii) at least one dehydration device (16) for receiving at least a portion of the concentrated liquid digestate (17) to produce the combustible dry materials (14) and a dehydration water (15), wherein the at least one dehydration device (16) is connected through the outlet conduit (3B) to the anaerobic fermenter (2).

6. The device according to claim 5, wherein the output conduit (3A) allows a portion of the concentrated liquid digestate (17) to flow out of the bottom of the anaerobic fermenter (2) and to enter the pump/milling machine (4).

7. The device according to claim 5, wherein the separator (5) receives a portion of the milled liquid digestate (27) and discharges a milled concentrated humid digestate (25B) and clarified water (24), and wherein the separator (5) is connected to the pump/milling machine (4) through at least one conduit (38) and connected to the water extractor (6) through at least one conduit (41).

8. The device according to claim 5, further comprising
a second anaerobic fermenter (10), wherein the second anaerobic fermenter (10) produces the second fraction of biogas (13B), wherein the second anaerobic fermenter (10) is connected to the second lysis device (18B) through at least one conduit (40A).

9. The device according to claim 8, wherein a third lysis device (18C) is connected to the separator (5) through at least one conduit (8), the first lysis device (18A) is connected to the water extractor (6) through at least one conduit (39) and the second lysis device (18B) is directly connected to the first lysis device (18A) through a conduit (9A).

10. The device according to claim 8, wherein the bottom of the first anaerobic fermenter (2) is connected to the second anaerobic fermenter (10) through at least one conduit (3C) leading a portion of the liquid digestate (17) to the second anaerobic fermenter (10).

11. The device according to claim 8, wherein the separator (5) is connected to:
at least one conduit (41) to allow the clarified water (24) to flow from the separator (5) to the water extractor (6),
at least one conduit (8) to allow the milled concentrated humid digestate (25B) to flow from the separator (5) to the third lysis device (18C) and,
optionally, a conduit (11) for recycling a portion of the milled concentrated digestate (25B) to the pump/milling machine (4).

12. The device according to claim 5, wherein the pump/milling machine (4) is immersed inside the anaerobic fermenter (2).

13. The device according to claim 8, wherein
the at least one dehydration device (16) is optionally connected to the second anaerobic fermenter (10) by a conduit (3E).

14. The device according to claim 8, wherein the dehydration water (15) from the at least one dehydration device (16) is recycled to at least one anaerobic fermenter (2, 10) through at least one conduit (15A).

15. A method for treating a biomass (1) mixed with water for producing in a decoupled way combustible dry materials (14), drinkable water (12) and a first fraction of biogas (13A), and a second fraction of biogas (13B), the drinkable water (12) not containing any suspended material and having a dry material content strictly less than 1%,
said method successively comprising the following steps:
(a) subjecting the biomass (1) mixed with water to anaerobic fermentation in a first anaerobic fermenter (2) to produce a concentrated liquid digestate (17) and the first fraction of biogas (13A), wherein the first anaerobic fermenter comprises at least two output conduits (3A; 3B), which are connected to the first anaerobic fermenter (2);
(b) pumping and milling a portion of the concentrated liquid digestate (17) by a pump/milling machine (4) to produce a milled concentrated liquid digestate (27) containing fibers and particles,
(c) feeding a portion of the concentrated liquid digestate (17) to a second anaerobic fermenter (10);
(d) separating, using a separator (5), the fibers and the particles in the milled concentrated liquid digestate (27) to produce clarified water (24) and a milled concentrated humid digestate (25B);
(e) feeding said clarified water (24) into at least one water extractor (6) to produce the drinkable water (12) and a remnant of a milled liquid digestate (25A), wherein a first portion of the remnant of milled liquid digestate (25A) is mixed with the clarified water (24) before the water extractor (6);
(f) passing a second portion of the remnant of milled liquid digestate (25A) through at least one lysis device (18A) and subsequently adding the resulting stream with the milled concentrated humid digestate (25B), which is optionally passed through at least one lysis device (18C), to obtain a milled and lyzed concentrated humid digestate (37);
(g) returning the milled and lyzed concentrated humid digestate (37), without any loss thereof,
to the second anaerobic fermenter (10), and optionally to the first anaerobic fermenter (2), for producing the second fraction of biogas (13B),
wherein the second anaerobic fermenter (10) comprises at least two output conduits (3E, 3F) connected to the second anaerobic fermenter (10);
(h) passing a portion of the concentrated liquid digestate (17) through the output conduit (3B) of the first anaerobic fermenter (2), and optionally through the output conduit (3E) of the second anaerobic fermenter (10), to a dehydration device (16), wherein the dehydration device (16) produces the combustible dry materials (14) and dehydration water (15), and the dehydration water (15) is returned directly to the first anaerobic fermenter, (2) and optionally to the second anaerobic fermenter (10), wherein the concentrated liquid digestate (17) is mixed, in the first and second anaerobic fermenters (2,10), with the milled and lyzed concentrated humid digestate after totally re-injecting the milled and lyzed concentrated humid digestate into the first and second anaerobic fermenters (2, 10).

\* \* \* \* \*